(12) United States Patent
Inomata et al.

(10) Patent No.: US 11,161,411 B2
(45) Date of Patent: Nov. 2, 2021

(54) DRIVING SUPPORT APPARATUS

(71) Applicant: TOYOTA JIDOSHA KABUSHIKI KAISHA, Toyota (JP)

(72) Inventors: Ryo Inomata, Hiratsuka (JP); Akira Nagae, Susono (JP); Masayuki Ikeda, Susono (JP); Hironori Ito, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 15/971,001

(22) Filed: May 4, 2018

(65) Prior Publication Data

US 2018/0326848 A1 Nov. 15, 2018

(30) Foreign Application Priority Data

May 11, 2017 (JP) .............................. JP2017-094568

(51) Int. Cl.
*G06F 7/00* (2006.01)
*G06F 17/00* (2019.01)
*B60K 31/16* (2006.01)
*B60K 31/00* (2006.01)

(52) U.S. Cl.
CPC ........... *B60K 31/00* (2013.01); *B60Y 2300/12* (2013.01); *B60Y 2300/146* (2013.01); *B60Y 2400/3015* (2013.01); *B60Y 2400/3032* (2013.01); *B60Y 2400/81* (2013.01); *B60Y 2400/90* (2013.01)

(58) Field of Classification Search
None
See application file for complete search history.

(56) References Cited

U.S. PATENT DOCUMENTS

| | | | | |
|---|---|---|---|---|
| 2005/0273262 A1* | 12/2005 | Kawakami | ........... | B62D 15/026 701/301 |
| 2009/0281701 A1* | 11/2009 | Kargman | ............. | B60K 26/021 701/70 |
| 2018/0105171 A1* | 4/2018 | Tsuji | ..................... | B60W 30/14 |

FOREIGN PATENT DOCUMENTS

| | | | | |
|---|---|---|---|---|
| JP | 2009-116693 A | | 5/2009 | |
| JP | 2009-255897 A | | 11/2009 | |
| JP | 2009255897 A | * | 11/2009 | .......... B60T 8/17557 |
| JP | 2011-037437 A | | 2/2011 | |
| JP | 2016-101891 A | | 6/2016 | |
| JP | 2018062296 A | * | 4/2018 | .......... B60W 30/143 |
| KR | 10-1673766 B1 | | 11/2016 | |

* cited by examiner

Primary Examiner — Adam D Tissot
(74) Attorney, Agent, or Firm — Sughrue Mion, PLLC

(57) ABSTRACT

A driving support apparatus is provided with: a first controller programmed to perform a first control, which is to make a speed of a vehicle not to exceed a predetermined speed; a second controller programmed to perform a second control, which is a driving support control that is different from the first control; a preventer configured to prevent the second control on the basis of an operation of an accelerator by an occupant of the vehicle; and a prevention reducer configured to control the preventer to hardly prevent the second control if the first control is performed, in comparison with when the first control is not performed.

5 Claims, 10 Drawing Sheets

DRIVING SUPPORT APPARATUS

CROSS-REFERENCE TO RELATED APPLICATIONS

This application is based upon and claims the benefit of priority of the prior Japanese Patent Application No. 2017-094568, filed on May 11, 2017, the entire contents of which are incorporated herein by reference.

BACKGROUND

1. Technical Field

Embodiments of the present disclosure relate to a driving support apparatus configured to perform a driving support control for a vehicle.

2. Description of the Related Art

For this type of driving support apparatus, for example, there is known an apparatus configured to prevent the driving support control when an operation is performed by an occupant or a passenger, in order to avoid the driving support control that is different from the occupant's intention. However, there may be a situation in which the driving support control should not be prevented even when the operation is performed by the occupant. For example, if the occupant is not sufficiently awake, an inappropriate operation is possibly performed, and it is thus preferable to hardly prevent the driving support control (e.g., Japanese Patent Application Laid Open No. 2009-116693 (Patent Literature 1)).

For a control of limiting a vehicle speed, there is known an auto speed limiter (ASL) control. During the ASL control, the vehicle is not accelerated to a speed that is greater than or equal to a predetermined speed even if an accelerator pedal is operated. That is why, in some cases, the occupant may aimlessly step on the accelerator pedal, even though the occupant does not have an intention to accelerate (hereinafter referred to as an acceleration intention).

In the above situation, it is sometimes erroneously determined that the occupant has the acceleration intention, because the accelerator pedal is operated. In this case, there is a possibility that the driving support control other than the ASL control, which originally should not be prevented, may be prevented as a result of the erroneous determination that the occupant has the acceleration intention. The prevention of the driving support control other than the ASL control in timing that is not intended by the occupant may cause the occupant to feel uncomfortable.

SUMMARY

In view of the aforementioned problems, it is therefore an object of embodiments of the present disclosure to provide a driving support apparatus configured to prevent the driving support control in appropriate timing, even if the control of limiting the vehicle speed is performed.

The above object of embodiments of the present disclosure can be achieved by a driving support apparatus provided with: a first controller programmed to perform a first control, which is to make a speed of a vehicle not to exceed a predetermined speed; a second controller programmed to perform a second control, which is a driving support control that is different from the first control; a preventer configured to prevent the second control on the basis of an operation of an accelerator by an occupant of the vehicle; and a prevention reducer configured to control the preventer to hardly prevent the second control if the first control is performed, in comparison with when the first control is not performed.

According to the driving support apparatus in embodiments of the present disclosure, in order to avoid that the second control is performed when the occupant of the vehicle has the acceleration intention, the second control is prevented on the basis of the operation of the accelerator pedal. However, if the first control for limiting the speed of the vehicle is performed, the second control is hardly prevented. The expression "the first control is performed" means a situation in which a driving force of the vehicle is actually limited in accordance with the predetermined speed. The expression "prevent" may include not only prohibiting the second control, but also reducing an implementation frequency of the second control, or reducing a support effect of the second control by reducing a controlled variable of the second control.

If the first control is performed, the vehicle is not accelerated even if the accelerator pedal is stepped on. Thus, there is a possibility that the occupant may aimlessly operate the accelerator pedal. It is thus hard to accurately determine whether or not the occupant has the acceleration intention on the basis of the operation of the accelerator pedal. Therefore, if the second control is hardly prevented when the first control is performed, it is possible to prevent that the second control is excessively prevented due to the erroneous determination. By this, it is possible to prevent that the second control is excessively prevented in timing that is not intended by the occupant.

In one aspect of the driving support apparatus according to embodiments of the present disclosure, the prevention reducer is configured to control the preventer not to prevent the second control if the first control is performed.

According to this aspect, the prevention of the second control is prohibited if the first control is performed. It is thus possible to certainly prevent that the second control is prevented in inappropriate timing that is not intended by the occupant.

In another aspect of the driving support apparatus according to embodiments of the present disclosure, the preventer is configured to prevent the second control if a parameter associated with the operation of the accelerator satisfies a predetermined condition, and the prevention reducer is configured (i) to control the preventer to use a first condition as the predetermined condition if the first control is not performed, and (ii) to control the preventer to use a second condition, which is more hardly satisfied than the first condition, as the predetermined condition if the first control is performed.

According to this aspect, the first condition, which is relatively easily satisfied, is used as the predetermined condition if the first control is not performed. On the other hand, the second condition, which is relatively hardly satisfied, is used as the predetermined condition if the first control is performed. Thus, the predetermined condition is hardly satisfied if the first control is performed, and as a result, the second control is hardly prevented.

In another aspect of the driving support apparatus according to embodiments of the present disclosure, the preventer is configured to prevent the second control by reducing a controlled variable of the second control, and the prevention reducer is configured (i) to control said preventer to reduce the controlled variable by a first predetermined amount if the first control is not performed, and (ii) to control said preventer to reduce the controlled variable by a second predetermined amount, which is smaller than the first predetermined amount, if the first control is performed.

According to this aspect, the controlled variable of the second control is relatively significantly reduced if the first control is not performed. On the other hand, the controlled variable of the second control is relatively less significantly reduced if the first control is performed. Thus, the controlled variable of the second control when the first control is performed is greater than the controlled variable when the first control is not performed. As a result, the second control is hardly prevented.

The nature, utility, and further features of this disclosure will be more clearly apparent from the following detailed description with reference to embodiments of the disclosure when read in conjunction with the accompanying drawings briefly described below.

DETAILED DESCRIPTION OF THE EMBODIMENTS

A driving support apparatus according to embodiments of the present disclosure will be explained with reference to the drawings. Hereinafter, a vehicle 1 equipped with the driving support apparatus according to embodiments of the present disclosure will be explained.

First Embodiment

Figure 1:
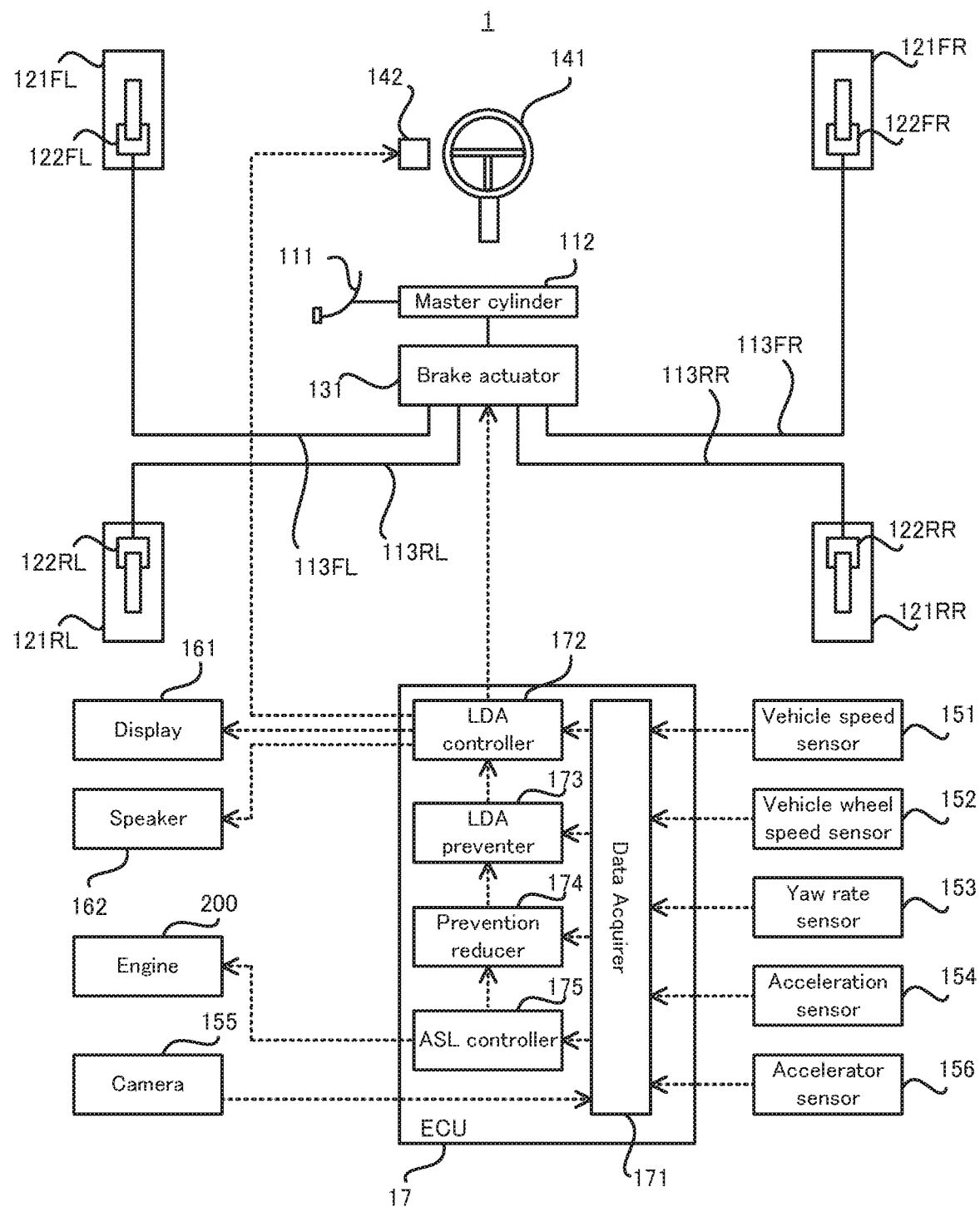
FIG. 1 is a block diagram illustrating a configuration of a vehicle according to a first embodiment.

A driving support apparatus according to a first embodiment will be explained with reference to FIG. 1 to FIG. 5.
(Configuration of Vehicle)
A configuration of the vehicle 1 according to the first embodiment will be explained with reference to FIG. 1. FIG. 1 is a block diagram illustrating the configuration of the vehicle 1 according to the first embodiment. As illustrated in FIG. 1, the vehicle 1 is provided with a brake pedal 111, a master cylinder 112, a brake pipe 113FL, a brake pipe 113RL, a brake pipe 113FR, a brake pipe 113RR, a front left wheel 121FL, a rear left wheel 121RL, a front right wheel 121FR, a rear right wheel 121RR, a wheel cylinder 122FL, a wheel cylinder 122RL, a wheel cylinder 122FR, a wheel cylinder 122RR, a brake actuator 131, a steering wheel 141, a vibration actuator 142, a vehicle speed sensor 151, a vehicle wheel speed sensor 152, a yaw rate sensor 153, an acceleration sensor 154, a camera 155, an accelerator sensor 156, a display 161, a speaker 162, and an electronic control unit (ECU) 17.

The brake pedal 111 is a pedal on which a driver steps to brake the vehicle 1. The master cylinder 112 is configured to adjust a pressure of brake fluid (or any fluid) in the master cylinder 112, to a pressure corresponding to a step amount of the brake pedal 111. Hereinafter, the pressure of the brake fluid will be simply referred to as a "hydraulic pressure".

The hydraulic pressure in the master cylinder 112 is transmitted to the wheel cylinders 122FL, 122RL, 122FR, and 122RR respectively via the brake pipes 113FL, 113RL, 113FR, and 113RR. Thus, braking forces corresponding to the hydraulic pressures transmitted to the wheel cylinders 122FL, 122RL, 122FR, and 122RR are respectively applied to the front left wheel 121FL, the rear left wheel 121RL, the front right wheel 121FR, and the rear right wheel 121RR.

The brake actuator 131 is configured to adjust the hydraulic pressure transmitted to each of the wheel cylinders 122FL, 122RL, 122FR, and 122RR, independently of the step amount of the brake pedal 111, under control of the ECU 17. Therefore, the brake actuator 131 is configured to adjust the braking force applied to each of the front left wheel 121FL, the rear left wheel 121RL, the front right wheel 121FR, and the rear right wheel 121RR, independently of the step amount of the brake pedal 111.

The steering wheel 141 is an operator operated by the driver to steer the vehicle 1 (i.e., to turn wheels to be steered or turned). In the first embodiment, the wheels to be steered or turned shall be the front left wheel 121FL and the front right wheel 121FR. The vibration actuator 142 is configured to vibrate the steering wheel 141, under the control of the ECU 17.

The vehicle speed sensor 151 is configured to detect a vehicle speed Vv of the vehicle 1. The vehicle wheel speed sensor 152 is configured to detect a wheel speed Vw of each of the front left wheel 121FL, the rear left wheel 121RL, the front right wheel 121FR, and the rear right wheel 121RR. The yaw rate sensor 153 is configured to detect a yaw rate y of the vehicle 1. The acceleration sensor 154 is configured to detect an acceleration G (specifically, a longitudinal acceleration Gx and a lateral acceleration Gy) of the vehicle 1. The camera 155 is an imaging device configured to image or photograph an outside situation ahead of or in front of the vehicle 1. The accelerator sensor 156 is configured to detect information about a step amount of a not-illustrated accelerator pedal. Detection data indicating detection results of the vehicle speed sensor 151 to the acceleration sensor 154 and the accelerator sensor 156, and image data indicating images photographed by the camera 155 are outputted to the ECU 17.

The display 161 is configured to display any information, under the control of the ECU 17. The speaker 162 is configured to output any audio, under the control of the ECU 17.

The ECU 17 is configured as a control unit programmed to control an entire operation of the vehicle 1. Particularly in the first embodiment, the ECU 17 is configured or programmed to perform a lane departure preventing operation for preventing the vehicle 1 from departing from a driving lane on which the vehicle 1 is currently running. In other words, the ECU 17 is configured or programmed to function as a control apparatus for realizing so-called lane departure alert (LDA) or lane departure prevention (LDP). A specific operation content of the lane departure preventing operation will be detailed later. The ECU 17 is also configured or programmed to perform a vehicle speed limit operation for limiting the speed of the vehicle 1 not to exceed a predetermined speed. In other words, the ECU 17 is configured or programmed to function as a control apparatus for realizing so-called auto speed limiter (ASL). A detailed explanation of the vehicle speed limit operation will be omitted because the existing technique/technology can be applied to the operation.

In order to perform the lane departure preventing operation and the vehicle speed limit operation, the ECU 17 is provided with a data acquirer 171, a LDA controller 172, a LDA preventer 173, a prevention reducer 174, an ASL controller 175, as processing blocks logically realized, or processing circuits physically realized inside the ECU 17. The data acquirer 171 is configured to obtain data indicating a state of the vehicle 1 from the various sensors 151 to 154, and 156, and the camera 155. The LDA controller 172 is configured to perform the lane departure preventing operation. The LDA controller 173 is configured or programmed to prevent the lane departure preventing operation performed by the LDA controller 172, in accordance with an acceleration intention of an occupant of the vehicle 1. The prevention reducer 174 is configured to control the LDA controller 173 to hardly prevent the lane departure preventing operation if the vehicle speed limit operation is performed. The ASL controller 175 is configured or programmed to perform the vehicle speed limit operation by limiting an output of an engine 200, which is a main power source of the vehicle 1. The LDA controller 172 is a specific example of the "second controller", and a BLDA control detailed later, which is performed by the lane departure preventing operation, is a specific example of the "second control". The LDA preventer 173 is a specific example of the "preventer", and the prevention reducer 174 is a specific example of the "prevention reducer". The ASL controller 175 is a specific example of the "first controller", and the vehicle speed limit operation is a specific example of the "first control".

(Lane Departure Preventing Operation)

Figure 2:
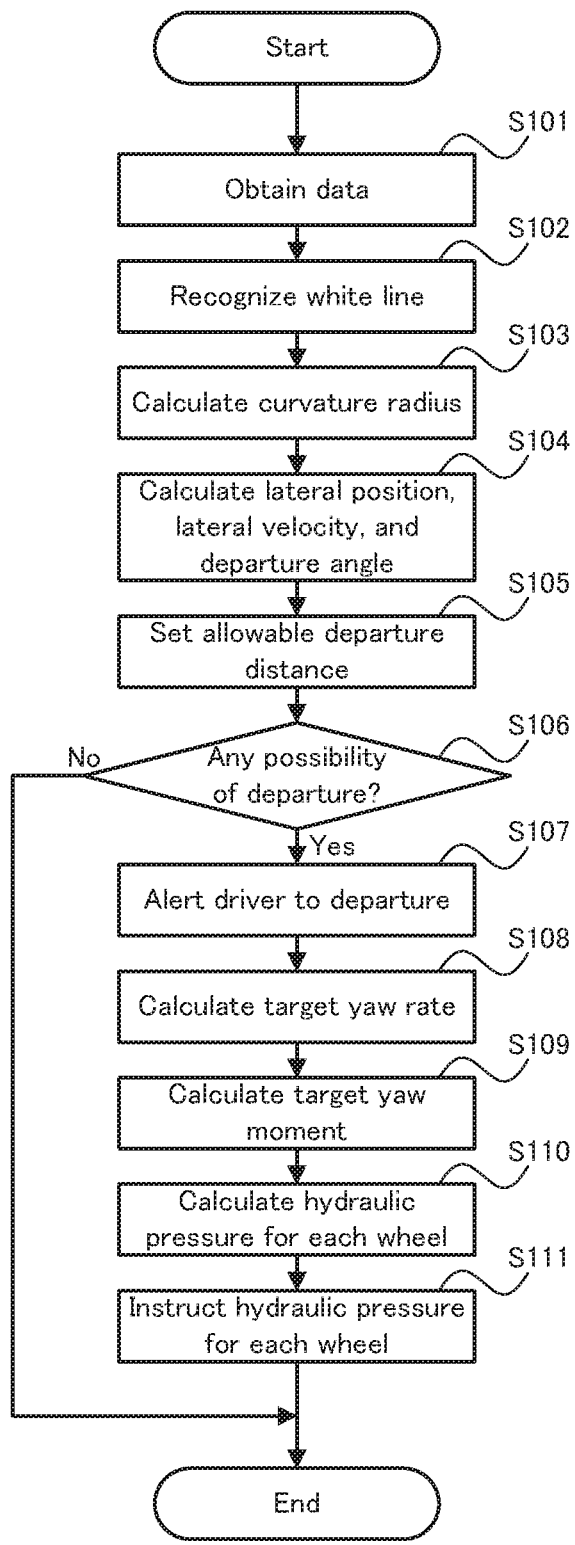
FIG. 2 is a flowchart illustrating a flow of a lane departure preventing operation according to the first embodiment.

Next, the lane departure preventing operation performed by the ECU 17 will be explained in detail with reference to a flowchart in FIG. 2. FIG. 2 is a flowchart illustrating a flow of the lane departure preventing operation according to the first embodiment.

In FIG. 2, firstly, the data acquirer 171 obtains detection data indicating detection results of the vehicle speed sensor 151, the vehicle wheel speed sensor 152, the yaw rate sensor 153, and the acceleration sensor 154, and image data indicating images photographed by the camera 155 (step S101).

The LDA controller 172 analyzes the image data obtained in the step S101, thereby specifying a lane edge of the driving lane on which the vehicle 1 is currently running (or a "white line" disclosed in the first embodiment as an example of the lane edge) in the images photographed by the camera 155 (step S102). A detailed explanation of a method of recognizing the white line will be omitted because the existing technique/technology can be applied to the method.

The LDA controller 172 determines whether or not the driving lane on which the vehicle 1 is currently running is a straight lane or a curve, on the basis of the white line specified in the step S102, and calculates a curvature radius of the driving lane if the driving lane is determined to be the curve (step S103). The curvature radius of the driving lane is substantially equivalent to a curvature radius of the white line. Thus, the LDA controller 172 may calculate the curvature radius of the white line specified in the step S102 and may treat the calculated curvature radius as the curvature radius of the driving lane.

The LDA controller 172 further calculates a current lateral position, a current lateral velocity, and a current departure angle of the vehicle 1, on the basis of the white line specified in the step S102 (step S104). Here, the "lateral position" means a distance from the center of the driving lane to the vehicle 1 (or typically, a distance to the center of the vehicle 1) in a lane width direction, which is orthogonal to a direction in which the driving lane extends (or a lane extension direction). The "lateral velocity" means a velocity or a speed of the vehicle 1 in the lane width direction. The "departure angle" means an angle made by the driving lane and a longitudinal direction axis of the vehicle 1, i.e., an angle made by the white line and the longitudinal direction axis of the vehicle 1.

The LDA controller 172 further sets an allowable departure distance (step S105). The allowable departure distance indicates an allowable maximum value of a departure distance of the vehicle 1 from the driving lane, i.e., a departure distance of the vehicle 1 from the white line, when the vehicle 1 departs from the driving lane.

For example, the allowable departure distance may be set in the following manner; namely, the LDA controller 172 may set the allowable departure distance from the viewpoint of satisfying requirements of law and regulations (e.g., requirements of new car assessment programme (NCAP)). A method of setting the allowable departure distance is not limited to this example.

Then, the LDA controller 172 determines whether or not there is a possibility that the vehicle 1 departs from the driving lane on which the vehicle 1 is currently running (step S106). For example, the LDA controller 172 may calculate a future position (e.g., in several hundred milliseconds to several seconds) of the vehicle 1, on the basis of a current speed or velocity, the current lateral position, the current lateral velocity, or the like of the vehicle 1. The LDA controller 172 may then calculate a departure amount of the vehicle 1 by comparing the future position of the vehicle 1 with the center of the driving lane. An example of the departure amount includes a deviation amount of the future position of the vehicle 1 in the lane width direction from the center of the driving lane. Then, the LDA controller 172 may determine whether or not the departure amount of the vehicle 1 is greater than a departure determination value. If it is determined that the departure amount of the vehicle 1 is greater than the departure determination value (e.g., the vehicle 1 goes across or is on the white line in the future position), the LDA controller 172 may determine that there is the possibility that the vehicle 1 departs from the driving lane.

In the determination in the step S106, if it is determined that there is no possibility that the vehicle 1 departs from the driving lane (the step S106: No), the lane departure preventing operation illustrated in FIG. 2 is ended. Then, the LDA controller 172 may restart the lane departure preventing operation illustrated in FIG. 2 after a lapse of a first predetermined period (e.g., several milliseconds to several ten milliseconds). In other words, the lane departure preventing operation illustrated in FIG. 2 may be repeated with a period corresponding to the first predetermined period.

On the other hand, in the determination in the step S106, if it is determined that there is the possibility that the vehicle 1 departs from the driving lane (the step S106: Yes), the LDA controller 172 alerts the driver of the vehicle 1 to the possibility of the departure of the vehicle 1 from the driving lane (step S107). Specifically, the LDA controller 172 may control the display 161, for example, to display an image indicating the possibility of the departure of the vehicle 1 from the driving lane, and/or may control the vibration actuator 142 to inform the driver of the possibility of the departure of the vehicle 1 from the driving lane by using the vibration of the steering wheel 141.

In parallel with the step S107, the LDS controller 172 performs a brake-LDA (BLDA) control (steps S108 to S111). At this time, the LDA controller 172 may turn on a flag associated with the BLDA control (hereinafter referred to as a "BLDA flag" as occasion demands). The BLDA control is a control in which a yaw moment in a direction of avoiding the departure is applied to the vehicle 1 so that the departure distance of the vehicle 1 from the driving lane is within the allowable departure distance.

In the BLDA control according to the first embodiment, the braking force may be applied at least one of the front left wheel 121FL, the rear left wheel 121RL, the front right wheel 121FR, and the rear right wheel 121RR to generate a braking force difference between the left and right wheels. As a result, the yaw moment in the direction of avoiding the departure may be applied to the vehicle 1. Hereinafter, the BLDA control will be specifically explained.

The LDA controller 172 arithmetically operates a target yaw rate so that the vehicle 1, which is leaving from the center of the driving lane, runs along a target track that is directed to the center of the driving lane, i.e., a traveling line to be targeted (step S108).

The LDA controller 172 then calculates a yaw moment to be applied to the vehicle 1 as a target yaw moment, in order to generate the target yaw rate in the vehicle 1 (step S109). For example, the LDA controller 172 may calculate the target yaw moment by converting the target yaw rate to the target yaw moment on the basis of a predetermined transfer function.

The LDA controller 172 then calculates a braking force that allows the target yaw moment to be achieved. At this time, the LDA controller 172 may individually calculate the braking forces to be respectively applied to the front left wheel 121FL, the rear left wheel 121RL, the front right wheel 121FR, and the rear right wheel 121RR.

The LDA controller 172 further calculates a pressure command value for designating the hydraulic pressure required to generate the braking force, which is calculated in the step S109 (step S110). At this time, the LDA controller 172 may individually calculate the pressure command values for respectively designating the hydraulic pressures inside the wheel cylinders 122FL, 122RL, 122FR, and 122RR.

The LDA controller 172 then controls the brake actuator 13 on the basis of the pressure command value (step S111). As a result, the braking force corresponding to the pressure command value is applied to at least one of the front left wheel 121FL, the rear left wheel 121RL, the front right wheel 121FR, and the rear right wheel 121RR. In other words, the yaw moment in the direction of avoiding the departure is applied to the vehicle 1 due to the braking force difference between the left and right wheels.

The LDA controller 172 may then restart the lane departure preventing operation illustrated in FIG. 2 after a lapse of the first predetermined period. At this time, the BLDA flag is on, and thus, the lane departure preventing operation is started while the yaw moment caused by the BLDA control is applied to the vehicle 1. In the determination in the step S106 performed again, if it is determined that there is the possibility that the vehicle 1 departs from the driving lane (the step S106: Yes), the process after the step S107 is performed. Thus, the application of the yaw moment caused by the BLDA control to the vehicle 1 is continued. On the other hand, in the determination in the step S106 performed again, if it is determined that there is no possibility that the vehicle 1 departs from the driving lane (the step S106: No), the BLDA flag is turned off, and the application of the yaw moment caused by the BLDA control to the vehicle 1 is ended.

In the first embodiment, it is explained that the BLDA control using a brake control is adopted as an example of the lane departure preventing operation; however, the lane departure preventing operation using a steering control may be also adopted.

(BLDA Control Preventing Operation)

Figure 3:
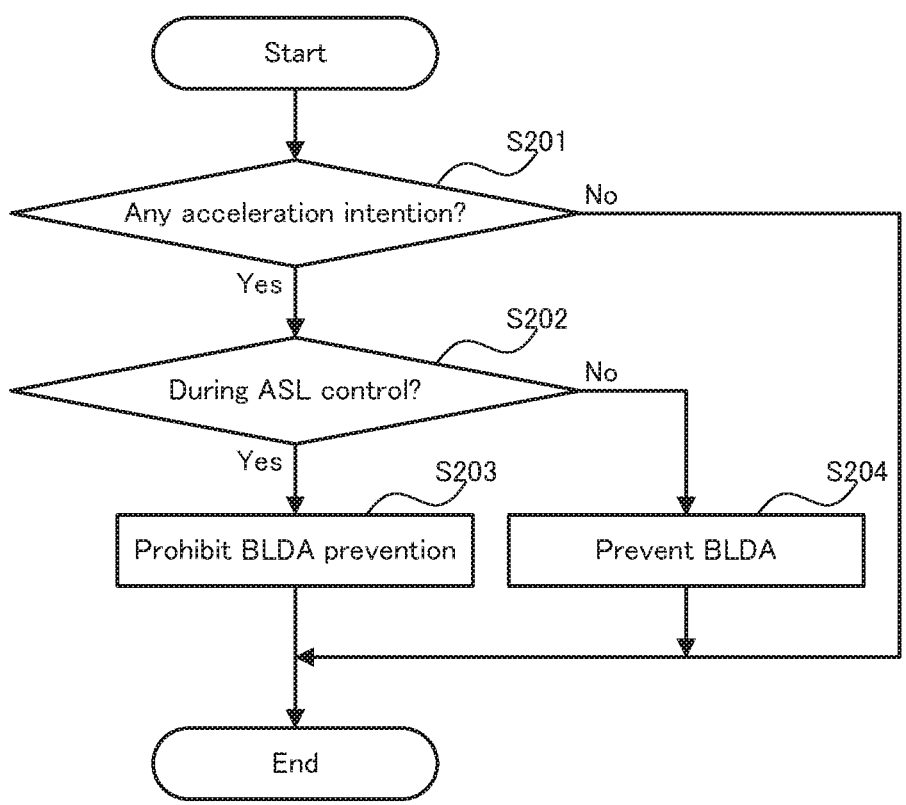
FIG. 3 is a flowchart illustrating a flow of a BLDA control preventing operation according to the first embodiment.

Next, a BLDA control preventing operation for preventing the BLDA control depending on circumstances will be explained with reference to FIG. 3. FIG. 3 is a flowchart illustrating a flow of the BLDA control preventing operation according to the first embodiment. The BLDA control preventing operation is performed in parallel with the lane departure preventing operation illustrated in the flowchart in FIG. 2.

In FIG. 3, in operation of the BLDA control preventing operation, the LDA preventer 173 determines whether or not the occupant of the vehicle 1 has the acceleration intention (step S201). The acceleration intention of the occupant may be determined on the basis of the detection data of the accelerator sensor 156 obtained by the data acquirer 171. Specifically, the LDA preventer 173 may determine whether or not the occupant has the acceleration intention by comparing a parameter associated with an operation of the accelerator pedal, such as an acceleration opening degree, an accelerator step increase speed, and the number of times of operating the accelerator, with a predetermined threshold value.

If it is determined that the occupant does not have the acceleration intention (the step S201: No), the subsequent process is omitted. This is because it is not necessary to prevent the BLDA control if the occupant does not have the acceleration intention. On the other hand, if it is determined that the occupant has the acceleration intention (the step S201: Yes), a process of determining whether or not the BLDA control is to be prevented after the step S202 is performed. This is because there is a possibility that the implementation of the BLDA control may give a discomfort to the occupant if the occupant has the acceleration intention.

The prevention reducer 174 then determines whether or not the vehicle speed limit operation by the ASL controller 175 (hereinafter referred to as a "ASL control" as occasion demands) is performed (step S202). Specifically, the prevention reducer 174 may determine whether or not a driving force, i.e., an output, of the engine 200 is limited by the ASL controller 175. If it is determined that the ASL control is performed (the step S202: Yes), the prevention reducer 174 prohibits the prevention of the BLDA control by the LDA preventer 173 (step S203). In this case, the LDA controller 172 may perform the BLDA control as usual, i.e., without being prevented. On the other hand, if it is determined that the ASL control is not performed (the step S202: No), the prevention of the BLDA control is not prohibited by the prevention reducer 174, and the LDA preventer 173 prevents the BLDA control (step S204). In this case, the LDA controller 172 may not perform the BLDA control even if it is determined that there is the possibility that the vehicle 1 departs from the driving lane (or if it is determined that the step S106 in FIG. 2 is determined to be "Yes"). Alternatively, the BLDA control may be performed while a controlled variable, i.e., the yaw moment to be applied, or a partial operation is limited.

According to the BLDA control preventing operation explained above, if the ASL control is performed even when it is determined that the occupant has the acceleration intention, the prevention of the BLDA control may be prohibited. This is because, although the BLDA control is to be prevented when the occupant has the acceleration intention, it is hard to accurately determine the acceleration intention of the occupant on the basis of the operation of the accelerator pedal when the ASL control is performed. For example, if the driving force of the engine 200 is limited by the ASL controller 175, there is a possibility that the occupant may aimlessly step on the accelerator pedal because the vehicle 1 is not accelerated even if the accelerator pedal is operated. Even if the accelerator pedal is operated, it is hard to accurately determine whether or not the occupant has the acceleration intention.

According to the driving support apparatus in the first embodiment, if the ASL control is performed and if the acceleration intention of the occupant cannot be accurately determined, the prevention of the BLDA control may be prohibited. On the other hand, if the ASL control is not performed, the BLDA control may be prevented in accordance with the determination of whether or not the occupant has the acceleration intention, wherein the determination is based on the operation of the accelerator pedal. Therefore, the BLDA control can be preferably performed even in the vehicle 1 that can perform the ASL control.

(Specific Operation Examples)

Next, specific operations when the prevention of the BLDA is prohibited will be explained with reference to FIG. 4 and FIG. 5. Each of FIG. 4 and FIG. 5 is a time chart illustrating specific operations in performing the BLDA control preventing operation according to the first embodiment.

Figure 4:
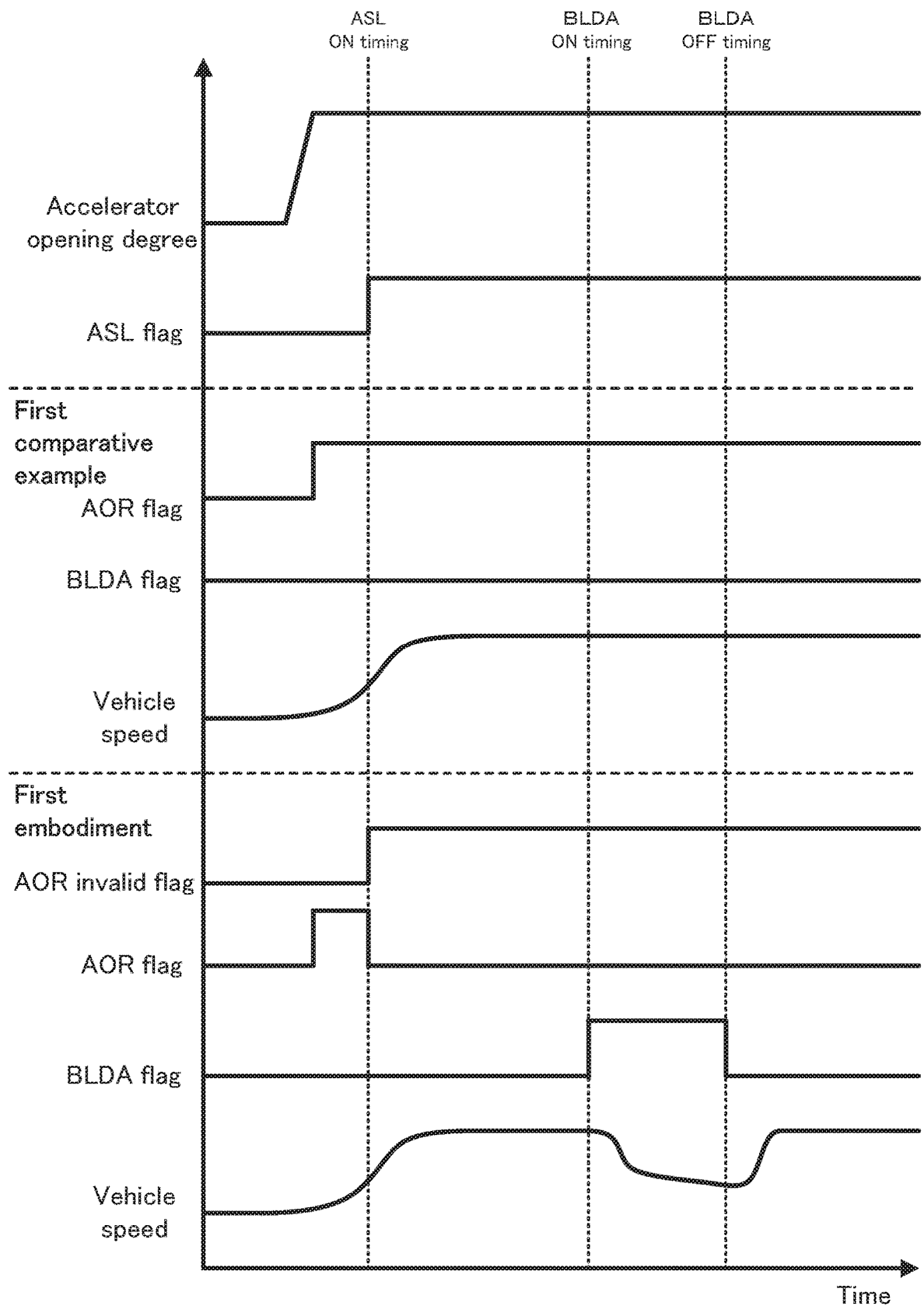
FIG. 4 is a version 1 of a time chart illustrating specific operations in performing the BLDA control preventing operation according to the first embodiment.
Figure 5:
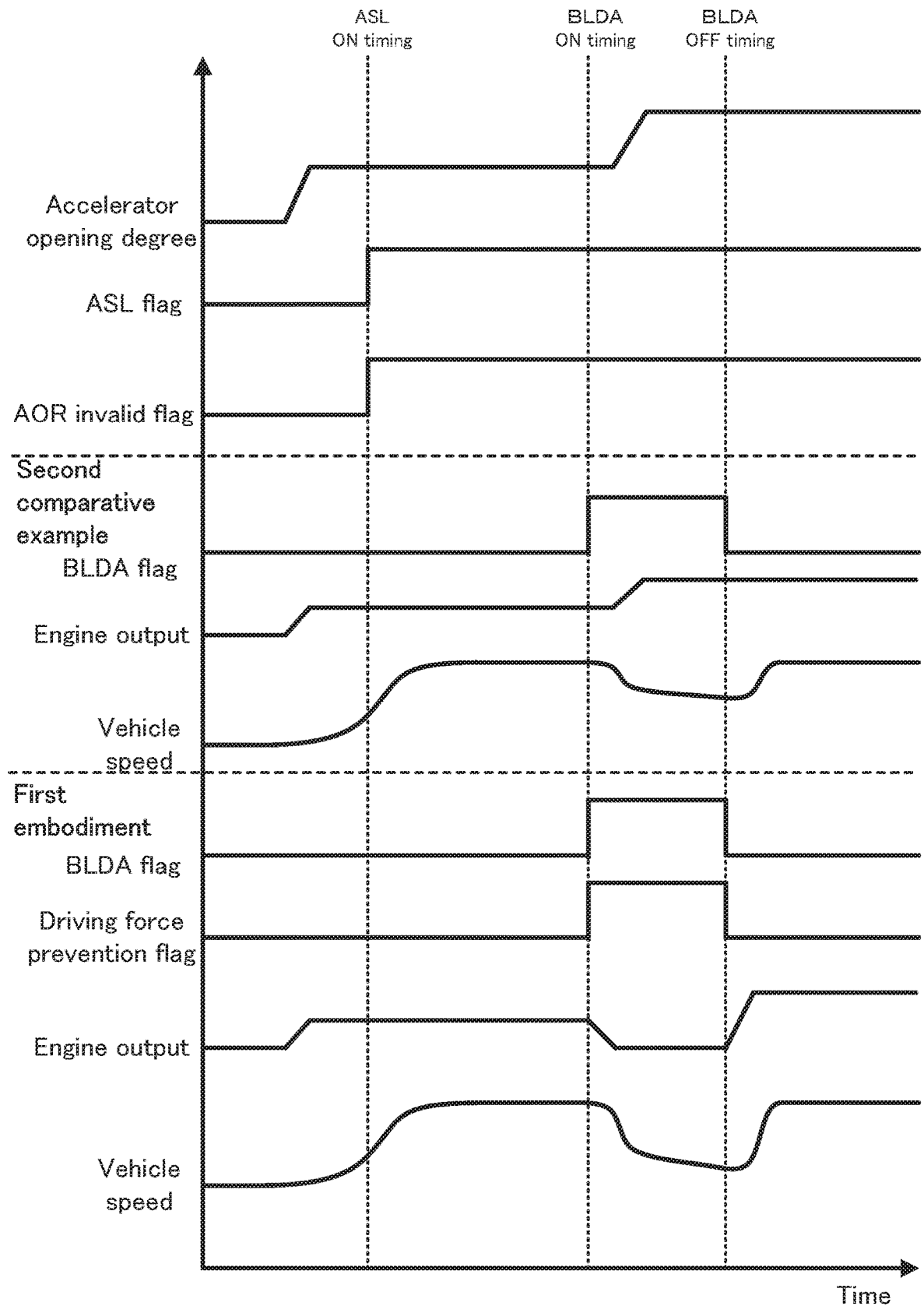
FIG. 5 is a version 2 of the time chart illustrating specific operations in performing the BLDA control preventing operation according to the first embodiment.

In an example illustrated in FIG. 4, an accelerator opening degree may be significantly increased by the occupant stepping on the accelerator pedal, and as a result, an ASL flag, i.e., a flag for determining whether or not to perform the ASL control, may be turned on.

In a first comparative example, unlike the first embodiment, the prevention of the BLDA control may not be prohibited, i.e., it may not be considered whether or not the ASL control is performed, and the BLDA control may be performed only on the basis of the determination of the acceleration intention. Thus, in the first comparative example, an accelerator over ride (AOR) flag, i.e., a flag for determining whether or not to perform AOR, which is a control of preventing the BLDA control on the basis of the stepping on the accelerator pedal by the occupant, may be turned on due to the increase in the accelerator opening degree, and the subsequent BLDA control may be prevented. As a result, even in timing in which the BLDA flag should be on (specifically, in timing in which it is determined that there is the possibility that the vehicle 1 departs from the driving lane), the BLDA flag may be maintained to be off, and the BLDA control may not be performed.

In contrast, in the first embodiment, at the same time that the ASL flag is turned on, an AOR invalid flag, i.e., a flag for invalidating the AOR and for prohibiting the prevention of the BLDA control, may be turned on. Thus, an AOR flag may be turned off at the same time that the ASL flag is turned on. As a result, the BLDA control may be performed in timing in which the BLDA flag is turned on.

As described above, by prohibiting the prevention of the BLDA control when the ASL control is performed, it is possible to prevent that the BLDA control is prevented in inappropriate timing due to an erroneous determination of the acceleration intention. If the BLDA control is performed during the ASL control, the limitation of the driving force by the ASL control may be released by the deceleration of the vehicle 1, and the effect of the BLDA control may not be sufficiently exhibited. Specifically, if the BLDA control is performed on the vehicle 1 with the driving force limited by the ASL control, i.e., the vehicle 1 having a vehicle speed of a predetermined speed that is an upper limit speed, then, the vehicle 1 is decelerated. However, because the vehicle speed becomes less than the predetermined speed due to the deceleration of the vehicle 1, the state of the vehicle 1 transits from a state in which the driving force is limited by the ASL control to a state in which the driving force is not limited by the ASL control. Thus, the driving force of the vehicle 1 is increased during the BLDA control, and the braking force difference between the left and right wheels possibly deviates from an original braking force difference required to apply the yaw moment in the direction of avoiding the departure to the vehicle 1. As a result, the effect of the BLDA control may be not sufficiently exhibited. Thus, in the first embodiment, as explained below, a process of preventing the driving force (specifically, a process of at least prohibiting, or preferably reducing, the increase in the driving force) may be performed if the BLDA control is performed during the ASL control.

In a second comparative example, the process of at least prohibiting, or preferably reducing, the increase in the driving force may not be performed if the BLDA control is performed during the ASL control. Thus, if the BLDA control is performed during the ASL control, the driving force of the vehicle 1, which is decreased in accordance with the implementation of the BLDA control, may be allowed to increase in a range in which the vehicle speed does not exceed the predetermined speed that is the upper limit speed. Thus, the driving force, i.e., an engine output, may be increased in accordance with the increase in the accelerator opening degree during the BLDA control. If the driving force is increased during the BLDA control, a deceleration amount due to the BLDA control may be reduced, and the effect of the BLDA control may be thus reduced.

In contrast, in the first embodiment, if the ASL flag is on and if the BLDA flag is on, a driving force prevention flag may be on. If the driving force prevention flag is on, the process of preventing the driving force may be performed. In an example illustrated in FIG. 5, the engine output is reduced to be zero or close to zero. Thus, the engine output during the BLDA control may be maintained to be extremely small even if the accelerator opening degree is increased. Thus, the effect of the BLDA control may be sufficiently exhibited. The engine output may be increased in timing which the BLDA control is ended, i.e., in timing in which the BLDA flag is turned off.

As explained above, according to the driving support apparatus in the first embodiment, it is possible to appropriately perform the BLDA control even if the ASL control is performed.

Second Embodiment

A driving support apparatus according to a second embodiment will be explained with reference to FIG. 6 to FIG. 9. The second embodiment is partially different in the operation from the already explained first embodiment, and is almost the same in the other operations and the configuration of the apparatus. Thus, in the second embodiment, a different part from that of the first embodiment will be explained in detail, and the explanation of the same part will be omitted.

(BLDA Control Preventing Operation)

Figure 6:
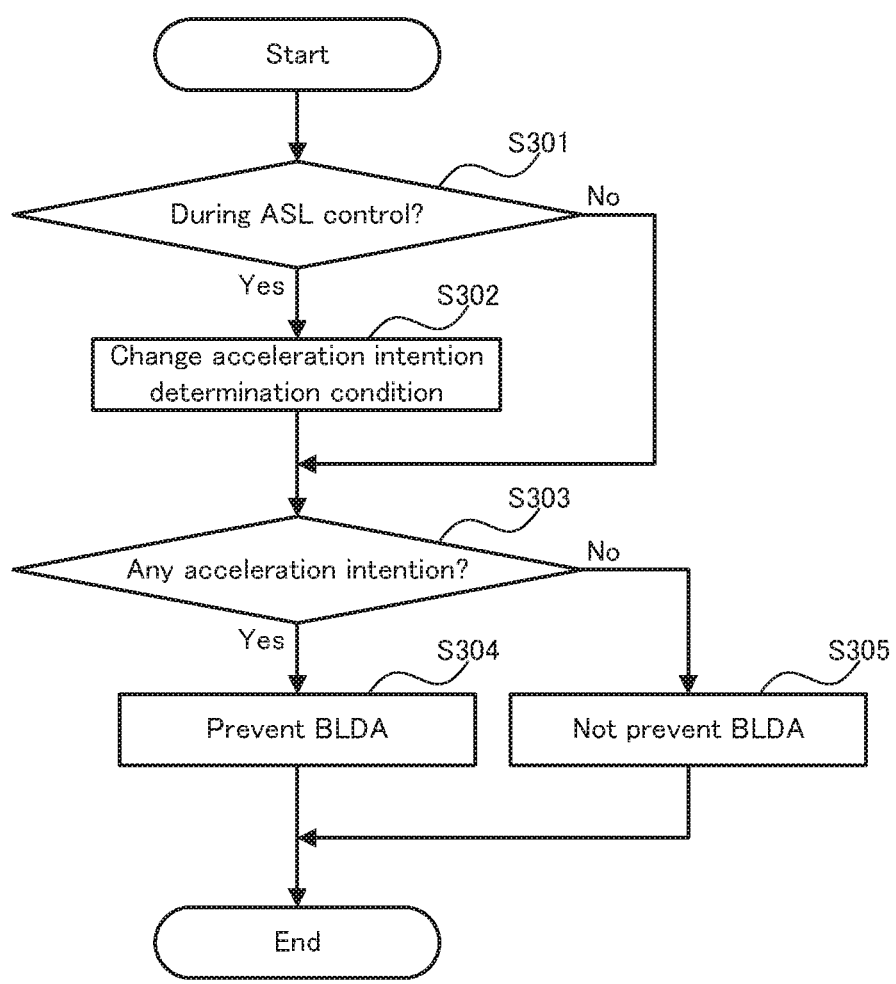
FIG. 6 is a flowchart illustrating a flow of a BLDA control preventing operation according to a second embodiment.

A BLDA control preventing operation according to the second embodiment will be explained with reference to FIG. 6. FIG. 6 is a flowchart illustrating a flow of the BLDA control preventing operation according to the second embodiment.

In FIG. 6, in operation of the BLDA control preventing operation according to the second embodiment, the prevention reducer 174 determines whether or not the ASL control is performed by the ASL controller 175 (step S301). In other words, the prevention reducer 174 determines whether or not the driving force of the engine 200 is limited by the ASL controller 175.

If it is determined that the ASL control is performed (the step S301: Yes), the prevention reducer 174 changes a condition when the LDA preventer 173 determines the acceleration intension (step S302). In other words, the prevention reducer 174 changes a determination condition in a step S303 described later. If it is determined that the ASL control is not performed (the step S301: No), the step S302 is omitted, and the condition in determining the acceleration intention is not changed. If it is determined in the step S303 that the occupant has the acceleration intention (the step S303: Yes), the LDA preventer 173 prevents the BLDA control (step S304). On the other hand, if it is determined that the occupant does not have the acceleration intention (the step S303: No), the LDA preventer 173 does not prevent the BLDA control (step S305).

Figure 7:
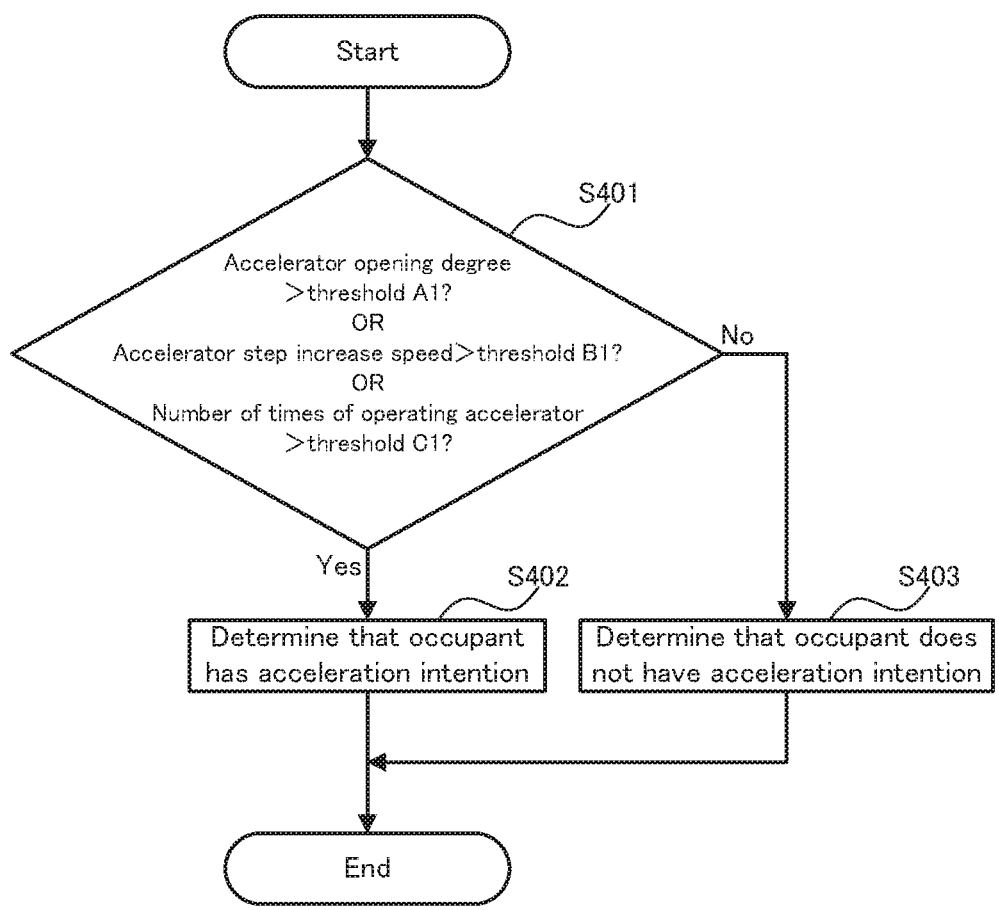
FIG. 7 is a flowchart illustrating a flow of an acceleration intention determination process before changing a determination condition.
Figure 8:
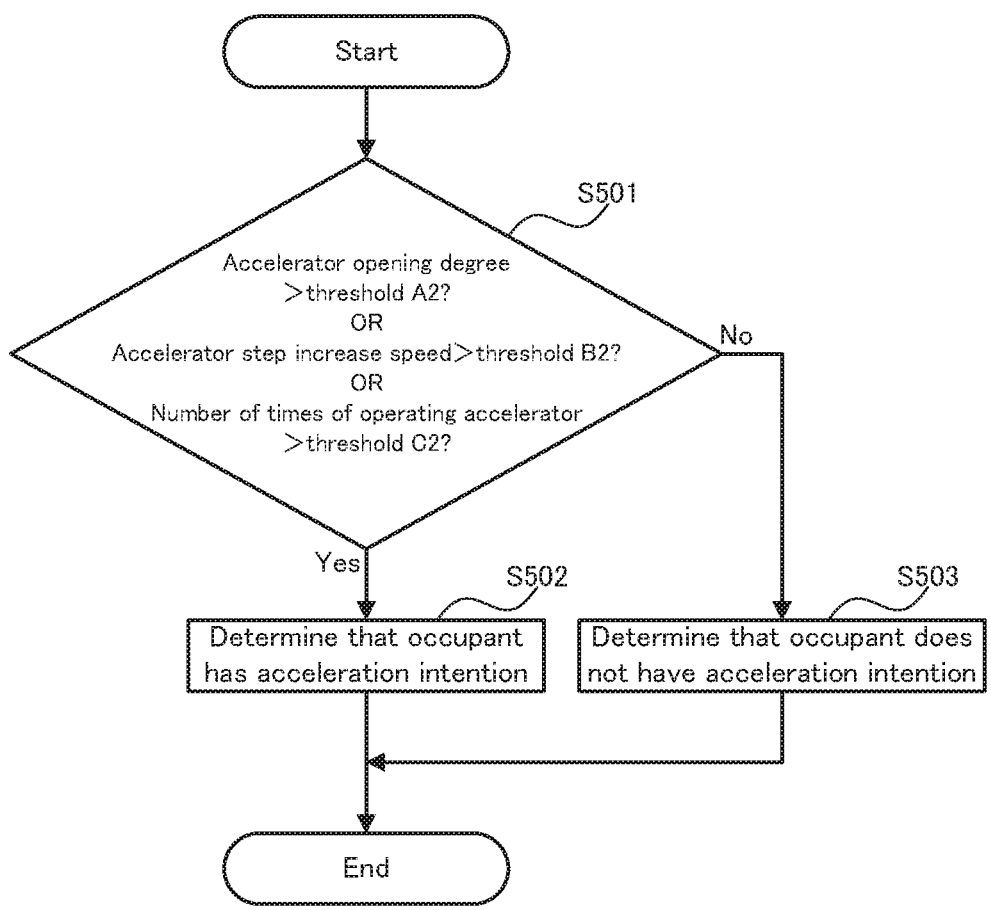
FIG. 8 is a version 1 of a flowchart illustrating a flow of the acceleration intention determination process after changing the determination condition.
Figure 9:
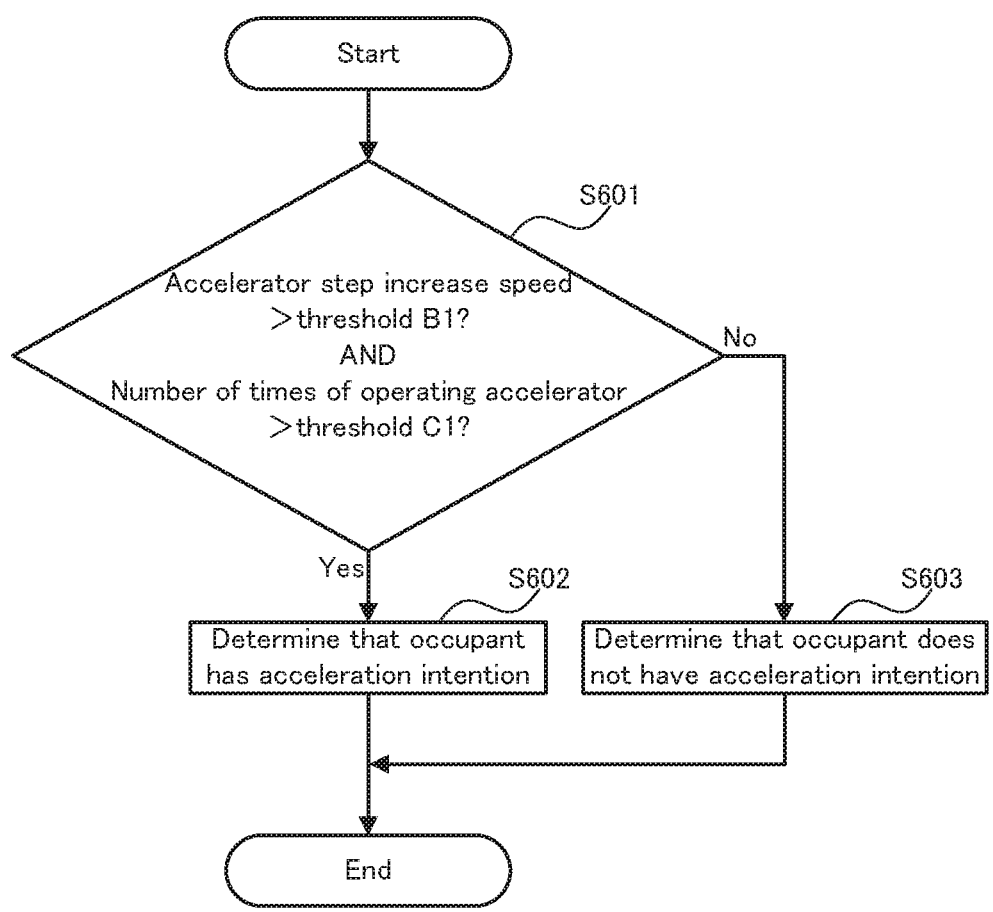
FIG. 9 is a version 2 of the flowchart illustrating a flow of the acceleration intention determination process after changing the determination condition.

Now, the change of the condition in determining the acceleration intention will be specifically explained with reference to FIG. 7 to FIG. 9. FIG. 7 is a flowchart illustrating a flow of an acceleration intention determination process before changing the determination condition. Each of FIG. 8 and FIG. 9 is a flowchart illustrating a flow of the acceleration intention determination process after changing the determination condition. FIG. 7 to FIG. 9 indicate the specific process content of the step S303 in FIG. 6. Moreover, the flowcharts illustrated in FIG. 8 and FIG. 9 indicate specific examples of the acceleration intention determination process after changing the determination condition, and any one of them may be selected.

In FIG. 7, in the determination of the acceleration intention in the normal case (i.e., before changing the condition), it is determined whether or not any of the following conditions is satisfied, i.e., "the accelerator opening degree>a threshold A1", "the accelerator step increase speed>a threshold B1", and "the number of times of operating the accelerator>a threshold C1" (step S401). If any of the above conditions is satisfied (the step S401: Yes), it is determined that the occupant has the acceleration intention (step S402). If none of the above conditions is satisfied (the step S401: No), it is determined that the occupant does not have the acceleration intention (step S403).

In FIG. 8, in the determination of the acceleration intention after changing the condition, it is determined whether or not any of the following conditions is satisfied, i.e., "the accelerator opening degree>a threshold A2", "the accelerator step increase speed>a threshold B2", and "the number of times of operating the accelerator>a threshold C2" (step S501). If any of the above conditions is satisfied (the step S501: Yes), it is determined that the occupant has the acceleration intention (step S502). If none of the above conditions is satisfied (the step S501: No), it is determined that the occupant does not have the acceleration intention (step S503).

Here, in particular, the thresholds before and after changing the condition may satisfy "the threshold A1<the threshold A2", "the threshold B1<the threshold B2", and "the threshold C1<the threshold C2". Thus, after changing the condition, it is hardly determined that the occupant has the acceleration intention. As described above, by changing the thresholds used for the determination, it is possible to easily realize a situation in which it is hardly determined that the occupant has the acceleration intention.

In FIG. 9, in the determination of the acceleration intention after changing the condition, it may be determined whether or not both of the following conditions are satisfied, i.e., "the accelerator step increase speed>the threshold B2", and "the number of times of operating the accelerator>the threshold C1" (step S601). In this case, if one of the above conditions is satisfied (the step S601: No), it is determined that the occupant does not have the acceleration intention (step S603). If both of the above conditions are satisfied (the step S601: Yes), it is determined that the occupant has the acceleration intention (step S602).

In the example in FIG. 9, in comparison with the example in FIG. 7, the condition about the accelerator opening degree is removed, while the OR condition is changed to the AND condition. Thus, after changing the condition, it may be hardly determined that the occupant has the acceleration intention. As described above, by changing the OR condition to the AND condition, it is possible to easily realize the situation in which it is hardly determined that the occupant has the acceleration intention. If the original condition is the OR condition, it is possible make it harder to determine that the occupant has the acceleration intention, only by reducing the number of parameters used for the determination. If the original condition is the AND condition, it is possible to make it harder to determine that the occupant has the acceleration intention, by increasing the number of the parameters used for the determination. Alternatively, it is possible to make it hard to determine that the occupant has the acceleration intention, by changing the parameter(s) used for the determination to another parameter that hardly satisfies a condition.

As explained above, in the second embodiment, if the ASL control is performed, the condition in determining the acceleration intention is changed to the condition that is hardly satisfied. Thus, if the ASL control is performed, it is hardly determined that the occupant has the acceleration intention, and as a result, the BLDA control is hardly prevented. It is therefore possible to prevent that the BLDA control is prevented in inappropriate timing, as in the first embodiment.

Third Embodiment

A driving support apparatus according to a third embodiment will be explained with reference to FIG. 10. The third embodiment is partially different in the operation from the already explained first and second embodiments, and is almost the same in the other operations and the configuration of the apparatus. Thus, in the third embodiment, a different part from those of the first and second embodiments will be explained in detail, and the explanation of the same part will be omitted.

(BLDA Control Preventing Operation)

A BLDA control preventing operation according to the third embodiment will be explained with reference to FIG. 10. FIG. 10 is a flowchart illustrating a flow of the BLDA control preventing operation according to the third embodiment.

Figure 10:
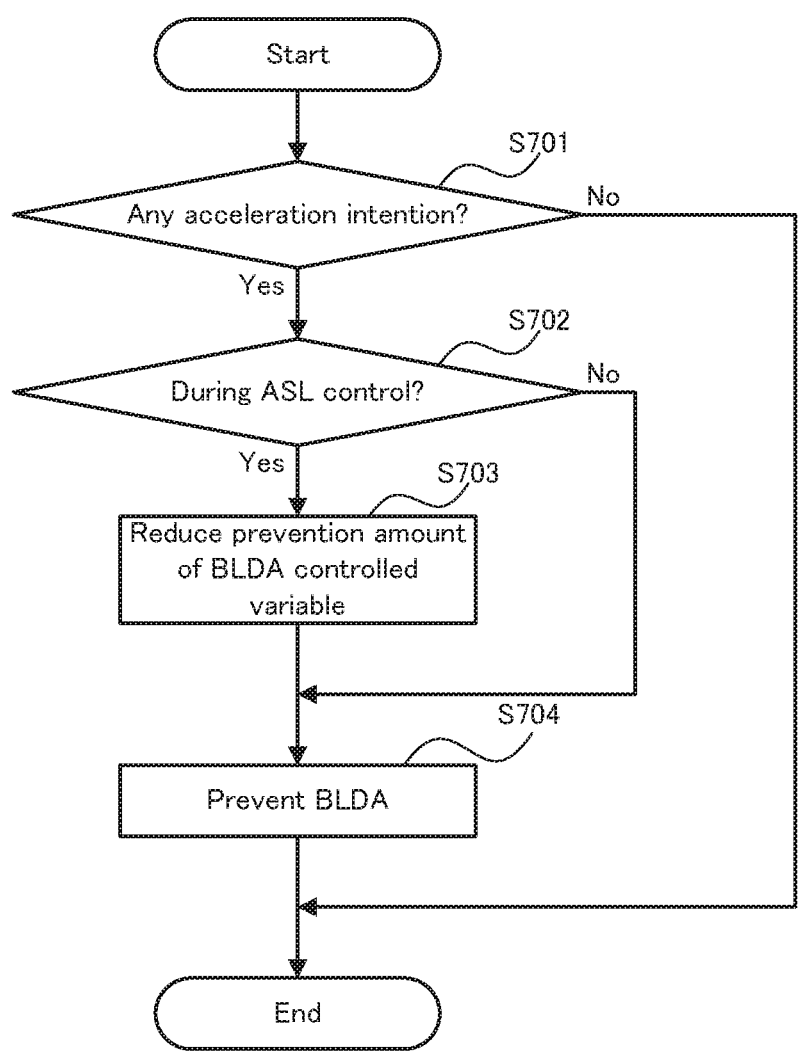
FIG. 10 is a flowchart illustrating a flow of a BLDA control preventing operation according to a third embodiment.

In FIG. 10, in operation of the BLDA control preventing operation according to the third embodiment, the LDA preventer 173 determines whether or not the occupant of the vehicle 1 has the acceleration intention (step S701). If it is determined that the occupant does not have the acceleration intention (the step S701: No), the subsequent process is omitted. On the other hand, if it is determined that the occupant has the acceleration intention (the step S701: Yes), the prevention reducer 174 determines whether or not the ASL control is performed by the ASL controller 175 (step S702).

If it is determined that the ASL control is performed (the step S702: Yes), the prevention reducer 174 reduces a prevention amount for the controlled variable of the BLDA control (i.e., the yaw moment to be applied) when the BLDA control is prevented in a step S704 described later (step S703). On the other hand, if it is determined that the ASL control is not performed (the step S702: No), the step S703 is omitted, and the prevention amount for the controlled variable of the BLDA control is not reduced.

Then, the LDA preventer 173 prevents the BLDA control (step S704). At this time, if the ASL control is not performed, the controlled variable of the BLDA may be reduced to a relatively small value because the prevention amount is not changed to be small, i.e., the prevention amount is relatively large. In other words, the effect of the BLDA control may be significantly reduced. On the other hand, if the ASL control is performed, the controlled varialbeo of the BLDA may be maintained to be relatively large because the prevention amount is changed to be smaller than in the normal case, i.e., the prevention amount is relatively small. In other words, the effect of the BLDA control may be maintained to be relatively high.

As explained above, on the driving support apparatus according to the third embodiment, the controlled variable of the BLDA control is changed depending on whether or not the ASL control is performed. By this, it is possible to realize a situation in which the BLDA control is hardly prevented, if the ASL control is performed. It is therefore possible to prevent that the BLDA control is prevented in inappropriate timing, as in the first and second embodiments.

In each of the embodiments described above, the prevention of the lane departure preventing operation, i.e., the LDA control, is exemplified; however, any driving support control that is to be prevented on the basis of the acceleration intention of the occupant can obtain the same effect, even in preventing a driving support control other than the lane departure preventing operation (e.g., lane keeping assistant (LKA), pre-crash safety (PCS), etc.).

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come within the meaning and range of equivalency of the claims are therefore intended to be embraced therein.

What is claimed is:

1. A driving support apparatus comprising:
a first controller programmed to perform a first control, which makes a speed of a vehicle not to exceed a predetermined speed;
a second controller programmed to perform a second control, which prevents the vehicle from departing from a driving lane; and
a third controller programmed to maintain the second control when an operation of an accelerator is performed and the first control is performed, and to prevent the second control when the operation of the accelerator is performed and the first control is not performed,
wherein the third controller is further programmed to prevent the second control if a parameter associated with the operation of the accelerator satisfies a predetermined condition, and
the third controller is further programmed (i) to use a first condition as the predetermined condition if the first control is not performed, and (ii) to use a second condition as the predetermined condition if the first control is performed, and
wherein the predetermined condition is based on an acceleration opening degree, an acceleration step increase speed, and a number of times of operating the accelerator.

2. The driving support apparatus according to claim 1, wherein the third controller is further programmed to prevent the second control by reducing a controlled variable of the second control, and
the third controller is further programmed (i) to reduce the controlled variable by a first predetermined amount if the first control is not performed, and (ii) to reduce the controlled variable by a second predetermined amount, which is smaller than the first predetermined amount, if the first control is performed.

3. The driving support apparatus according to claim 1, wherein the first controller, second controller and third controller are contained within an electronic control unit within the vehicle.

4. The driving support apparatus according to claim 1, wherein the first controller and the second controller are programmed to utilize data acquired from a vehicle speed sensor, an acceleration sensor, a yaw rate sensor, a vehicle wheel speed sensor, and a camera within the vehicle.

5. The driving support apparatus according to claim 3, further comprising a display programmed to display information from the electronic control unit and a speaker programmed to output audio from the electronic control unit.

* * * * *